United States Patent [19]

Bi et al.

[11] Patent Number: 5,134,709
[45] Date of Patent: Jul. 28, 1992

[54] PROCESS AND APPARATUS FOR FLEXIBLE CHANNEL ASSIGNMENT IN CELLULAR RADIOTELEPHONE SYSTEMS

[75] Inventors: Qi Bi, Morris Plains; Joseph W. Fisher, Randolph, both of N.J.

[73] Assignee: AT&T Bell Laboratories, Murray Hill, N.J.

[21] Appl. No.: 627,298

[22] Filed: Dec. 14, 1990

[51] Int. Cl.$^5$ .............................................. H04Q 7/00
[52] U.S. Cl. .................. 455/33.1; 455/34.1; 379/59
[58] Field of Search .............. 455/33, 34, 54, 56, 455/67; 379/59, 60, 63

[56] References Cited

U.S. PATENT DOCUMENTS

| | | |
|---|---|---|
| 3,764,915 | 10/1973 | Cox et al. |
| 4,670,906 | 6/1987 | Thro ........................................ 455/56 |
| 4,736,453 | 4/1988 | Schloemer . |
| 4,965,850 | 10/1990 | Schloemer ............................ 455/34 |

OTHER PUBLICATIONS

"A Strategy for Flexible Channel Assignment in Mobile Communication Systems", by Jun Tajima & Kenji Imamura, IEEE Transactions on Vehicular Technology, vol. 37, No. 2, May 1988, pp. 92–103.

"New Cellular Schemes for Spectral Efficiency", by William C. Y. Lee, IEEE Transactions on Vehicular Technology, vol. VT-36, No. 4, Nov. 1987, pp. 188–192.

"Elements of Cellular Mobile Radio Systems", by William C. Y. Lee, IEEE Transactions on Vehicular Technology, vol. VT-35, No. 2, May 1986, pp. 48–56.

*Primary Examiner*—Curtis Kuntz
*Attorney, Agent, or Firm*—A. G. Steinmetz

[57] ABSTRACT

A channel assignment system provides channel assignments to make effective use of the available frequency spectrum by assigning one channel at a time until all the channels in the allotted frequency spectrum are used. A pre-allocation step assigns specified channels to certain cells and these assignments are checked against initial input system constraints. Then the remaining channels are assigned one at a time to the cells according to defined system performance constraints and the number of channels required by each cell. Each cell is defined by its logical faces. The traffic load for each logical face is defined according to selected factors which may include call rates, blocking rates, handoff thresholds, access thresholds, call drop rates, etc. Given these factors the number of channels required by each logical face can be derived and input to the channel assignment system. A level of interference is determined for each logical face as caused by every other logical face by a signal matrix computer. Factors involved in this determination include geographical terrain, transmitting antenna properties transmission power and the location of individual cells. A signal-to-interference matrix is developed from this information. The individual channels are now assigned to the logical faces based on the developed information including the number of channels needed at each logical face, the signal interference matrix and other system constraints.

16 Claims, 9 Drawing Sheets

PROCESS AND APPARATUS FOR FLEXIBLE CHANNEL ASSIGNMENT IN CELLULAR RADIOTELEPHONE SYSTEMS

FIELD OF THE INVENTION

This invention relates to a method and apparatus for making channel assignments in a radiotelephone communication system and in particular to cellular type radiotelephone communication systems using frequency reuse characteristics.

BACKGROUND OF THE INVENTION

The subscriber capacity of a mobile radiotelephone system is limited by the frequency spectrum allocated to such use. To optimize the subscriber capacity of a given system it is critical that the allocated frequency spectrum be used with the highest possible efficiency. Improvements in this efficiency may be attained by application of various modulation and coding techniques in the transmission system to achieve the highest efficient use of the available frequency spectrum.

Increasing the use of the available frequency spectrum has been greatly enhanced by application of the cellular concept to radiotelephone systems. With the cellular concept, the area served by a radiotelephone provider is divided into contiguous geographical cells each being served by a particular set of channels. Cells separated from one another by a certain number of intervening cells, with a distance large enough to prevent transmission interference, normally can reuse the same transmission channels. Such channel reuse greatly enhances the efficient use of the available frequency spectrum.

To fully realize the advantages of the cellular concept requires that the various transmission frequencies or channels be effectively allocated to the various cells in a manner which utilizes the available spectrum as efficiently as possible. Such frequency/channel allocations have traditionally been assigned to the various cells by using the channel set concept in which each cell is assigned a particular set of channels.

In the traditional methods of allocation, cell coverage is assumed to be a regular polygon and traffic usage is assumed to be uniformly distributed. The polygons are all considered to be uniformly tiled to cover a geographic service area. For purposes of initial channel assignment the actual geographic terrain and actual RF propagation is ignored. Channels are equally assigned in sets of channels to the various cells until all the cells have been assigned the total number of channels. At this point adjustment is made to account for the actual irregular geographic cell layout and the actual terrain irregularities. Further adjustment considers any unequal service demand among the cells and specifically attempts to minimize co-channel and adjacent channel interferences. This method of channel assignment normally involves so many initial gross assumptions that the final result is much below the desired efficiency of spectrum use.

Some non regular channel assignment techniques have attempted to exploit the differences in geographic terrain, RF propagation and service demand to permit a more efficient allocation of the available frequency spectrum. These methods may not partition the spectrum into sets of channels and does not proscribe any particular reuse pattern. These assignment techniques have been mostly ad hoc to date and are normally highly labor intensive in application since they are for the most part applied manually. These techniques do not readily permit adjustment of channel allocations to accommodate changes or growth in service demand.

To permit full utilization of the allotted spectrum requires an allocation system that permits an allocation of channels according to a designed scenario and actual physical conditions and one which readily adapts to changes in service demand.

SUMMARY OF THE INVENTION

A channel assignment system embodying the principles of the invention provides channel assignments which make effective use of the available frequency spectrum by assigning one channel at a time until all the channels in the allotted frequency spectrum are used or until no further assignments are possible. It is necessary only that the assignments satisfy the input system performance constraints. A pre-allocation step can be used to assign specified channels to certain cells and these assignments are checked against initial input system constraints. Following this optional pre-allocation step, channels are assigned one at a time to the cells according to defined system performance constraints and the number of channels required by each cell.

In a particular illustrative procedure each cell is defined by its logical faces. Logical faces are defined to be any area served by a given radio transmitter and its antennas. If, for example, a cell is sectorized by directional antennas into pie shaped serving areas each such serving area would be a logical face. If the cell is divided by application of overlays each new area defined by the overlay would be an additional logical face. A typical overlay might be defined as the addition of new antennas to partition a service area into a set of smaller serving areas. The traffic load for each logical face is defined according to selected factors which may include call rates, blocking rates, handoff thresholds, access thresholds, call drop rates, etc. Given these factors the number of channels required by each logical face can be derived and input to the channel assignment system.

A level of interference is determined for each logical face as caused by every other logical face by a signal matrix computer. Factors involved in this determination include geographical terrain, transmitting antenna properties, transmission power and the location of individual cells. A signal-to-interference matrix is developed from this information by a signal matrix computer.

The individual channels are now assigned to the logical faces by a channel assignement computer based on the developed information including the number of channels needed at each logical face, the signal interference matrix and other system constraints.

DETAILED DESCRIPTION

Figure 1:
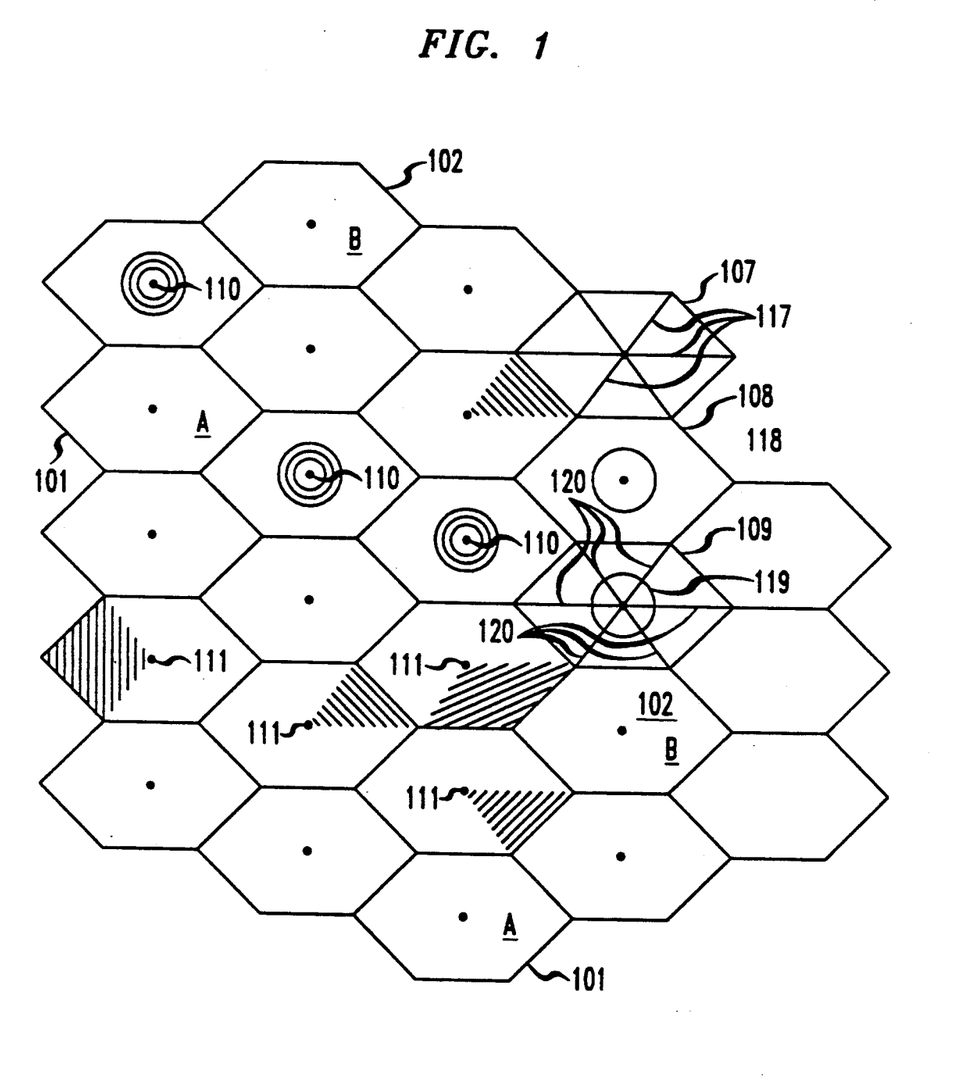
FIG. 1 is a schematic of an idealized cell layout for a cellular telephone system typical in conventional channel assignments.

For analysis purposes the geographical layout of a cellular radiotelephone system is normally depicted as a tiling of hexagons on a planar earth surface such as shown in FIG. 1. Diagrams such as these, idealizing a geographical service area have been found useful in assigning channel frequencies to the various cells in patterns that allow the channel frequencies to be reused. Such patterns are defined in terms of repeatable patterns of the hexagonal cells based on estimated cell size and on the distance between co-channel cell sites. In one illustrative channel frequency reuse scheme the cells 101 designated A would use the same set of channel frequencies. The same would hold true with respect to the cells 102 designated B which would use a second set of channel frequencies and so on. Because of the geographical separation the signals in the A cells would not interfere with each other, although the same set of frequencies/channels are used.

In this model each cell is illuminated by an antenna or antennas located at the center of the hexagonal cell. These antennas may be omnidirectional (illustrated by antennas 110) or directional (illustrated by antennas 111) to cover a certain portion of the cell defined as an angular sector. Such sectors are usually designated as a submultiple of 360 degrees with values of 60 and 120 degrees occurring most often. With such antennas each antenna would define a particular logical face or faces of the cell's hexagon boundary.

As shown in FIG. 1 the cell 107 may be divided into six sectors separated by the dividing lines 117. In this arrangement the six sectors would each be considered an individual logical face. In cell 108 the cell has been divided into two regions by an overlay that divides the cell into a region inside the circle 118 and the balance of the cell into a region outside the circle. Each of these regions would be considered a logical face. With respect to cell 109 the cell has an overlay defined by the circle 119 and is sectorized by the radial lines 120. This particular example has twelve logical faces.

Figure 2:
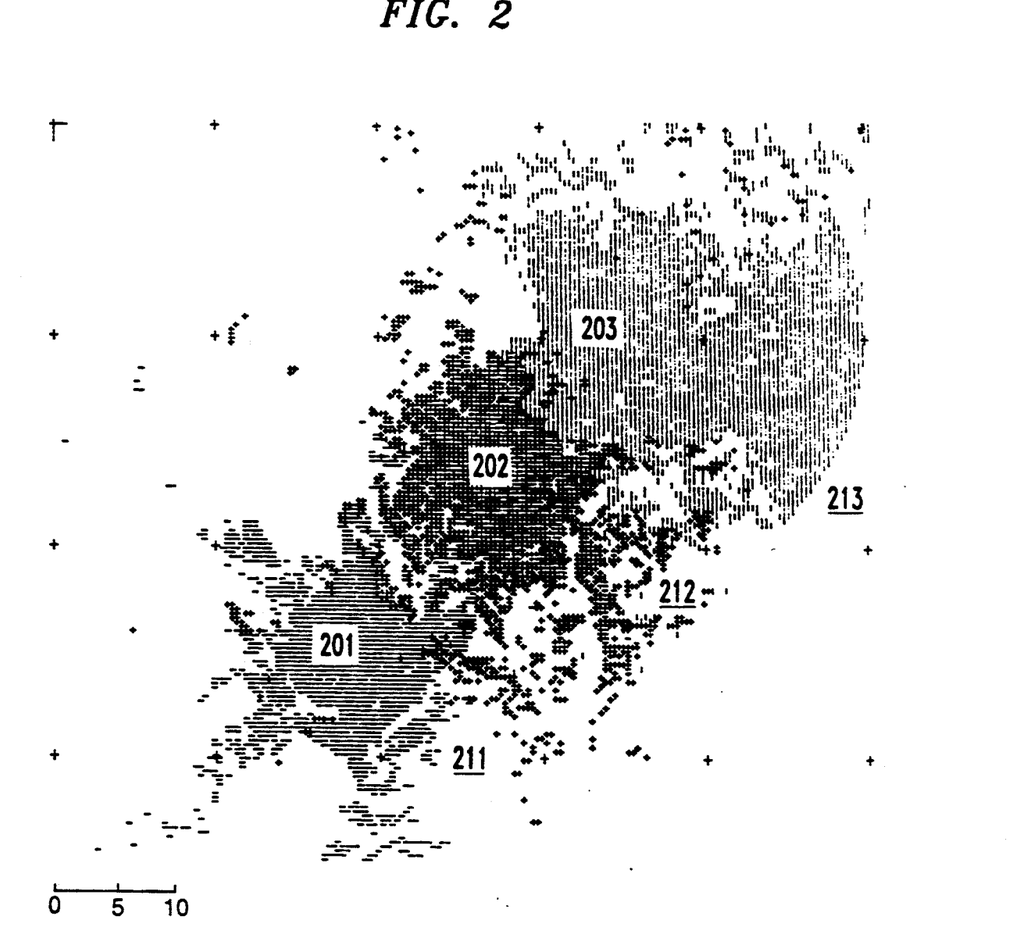
FIG. 2 is schematic representation of the realistic radio propagation coverage of a cell of a cellular telephone system.

In practice the area radiated or served by a cell antenna does not even approximate the hexagonal area so favored in published descriptions of cellular radiotelephone systems. The propagation of the radio signals radiated by the antennas is determined by many factors including signal strengths, geographical terrain, antenna characteristics and signal interference from other cells. A more realistic pattern of a cell is shown in FIG. 2 which depicts three adjacent cellular serving cells featuring omnidirectional antennas. Each cell area 211, 212 and 213 is defined by the propagation pattern of its radiating antennas 201, 202 and 203 (These cells could be further partitioned by using overlays). As indicated earlier, any method of channel assignment which idealizes service areas into pre-defined geometric shapes and/or which assumes uniform traffic needs will generally result in a less than desirable spectrum utilization.

Figure 3:
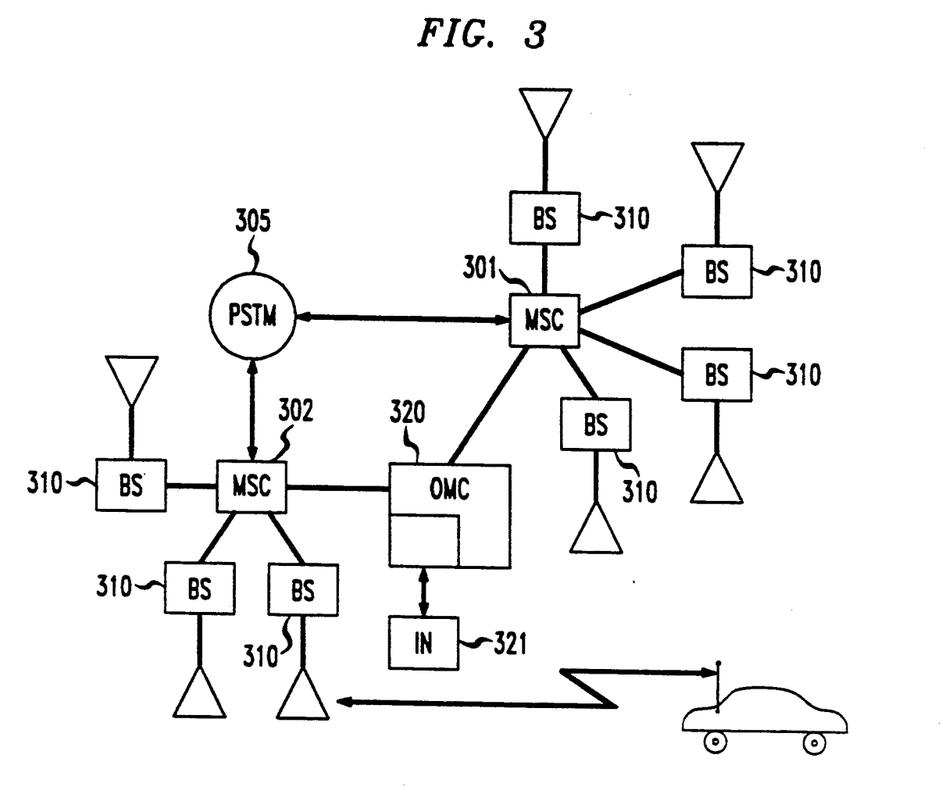
FIG. 3 is a block schematic of a cellular radio telephone system.
Figure 4:
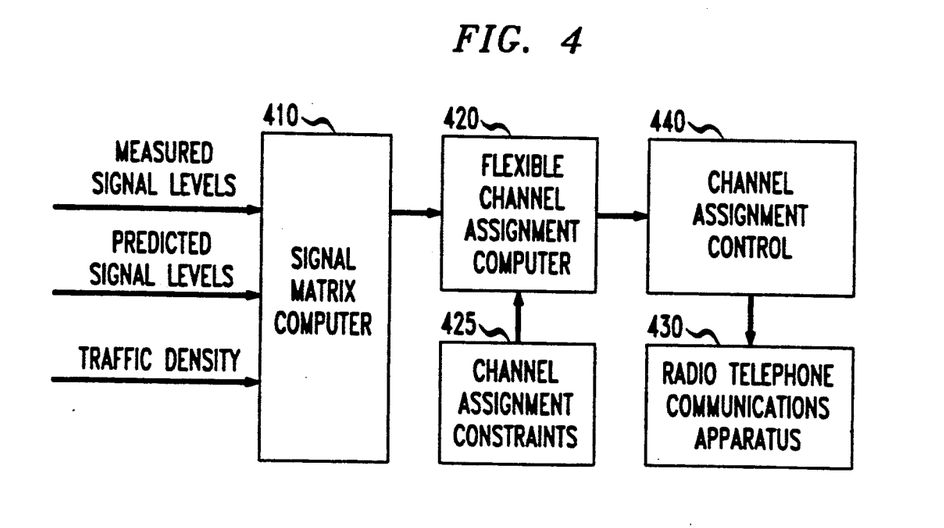
FIG. 4 is a block schematic of a system for assigning channels to various cells of a cellular radiotelephone system.

An illustrative cellular radiotelephone system shown in FIG. 3 includes a plurality of mobile switching centers (MSC) 301 and 302 which interconnect the mobile radiotelephone system to the land public switched telephone network (PSTN) 305. Each MSC is connected to a plurality of base stations 310 which include the radio transmission equipment for serving the mobile radiotelephones 350 within its cell area. An operations and management center (OMC) 320 is coupled to control the operation of the MSCs 301 and 302 and their associated base stations 310. OMC 320 is a central control station which is operative to control processes and operation of the MSCs and their allocated base stations 310. It includes data processing equipment, such as shown in FIG. 4, and input consoles 321 allowing data input and real time control inputs. This arrangement may be used to implement channel assignments in combination with remotely tunable radio transceivers at the cell sites.

A portion of the data processing equipment is shown in FIG. 4 and includes a signal matrix computer 410. Signal matrix computer 410 accepts data input in one form and converts it to a form suitable for data processing manipulation. In the illustrative embodiment herein, this form suitable for processing is a matrix X of integers in which each integer $x_{ij}$ of the matrix element represents a signal interference value for the faces i from j. The signal matrix computer 410 may comprise special dedicated circuitry or may be performed by a data processor under stored program control. Input to the signal matrix computer 410 may include measured signal levels taken within the cells or may include theoretical predicted signal strengths for the cell and information as to the traffic density and usage for each cell.

The signal matrix computer 410 places this information in a format suitable for further data processing and applies it to the channel assignment computer 420 which includes a stored program control for assigning the available channels to the various cells within the system control. This stored program control is discussed in detail herein below. The channel assignment computer accepts input from the signal matrix computer 410. A data source of channel assignment constraints 425 is coupled to input this data to the channel assignment computer 420. Such constraints are user defined system performance requirements desirable for achieving satisfactory operation of the mobile radiotelephone system.

An output of the channel assignment computer is applied to channel assignment control apparatus 440 which in turn is operative to adjust actual channel assignments of the radiotelephone communications apparatus. While this apparatus 430 is shown as a single block it represents a plurality of radio transceivers located in and distributed amongst the various base sites 310. This assignment control apparatus 440 may include means for transmitting data signals to the radio transceivers at the base sites 310, shown in FIG. 3 or it may provide a printout of frequency assignments to be executed by a crafts person manually tuning radio transceivers at each base site. It is operative in the automated version to send signals to each base site 310 to control the tuning of remotely tunable radio transceivers. Alternatively the output of the channel assignment control 440 may be instructions directing a craftsperson to manually tune the various transceivers.

Figure 5:
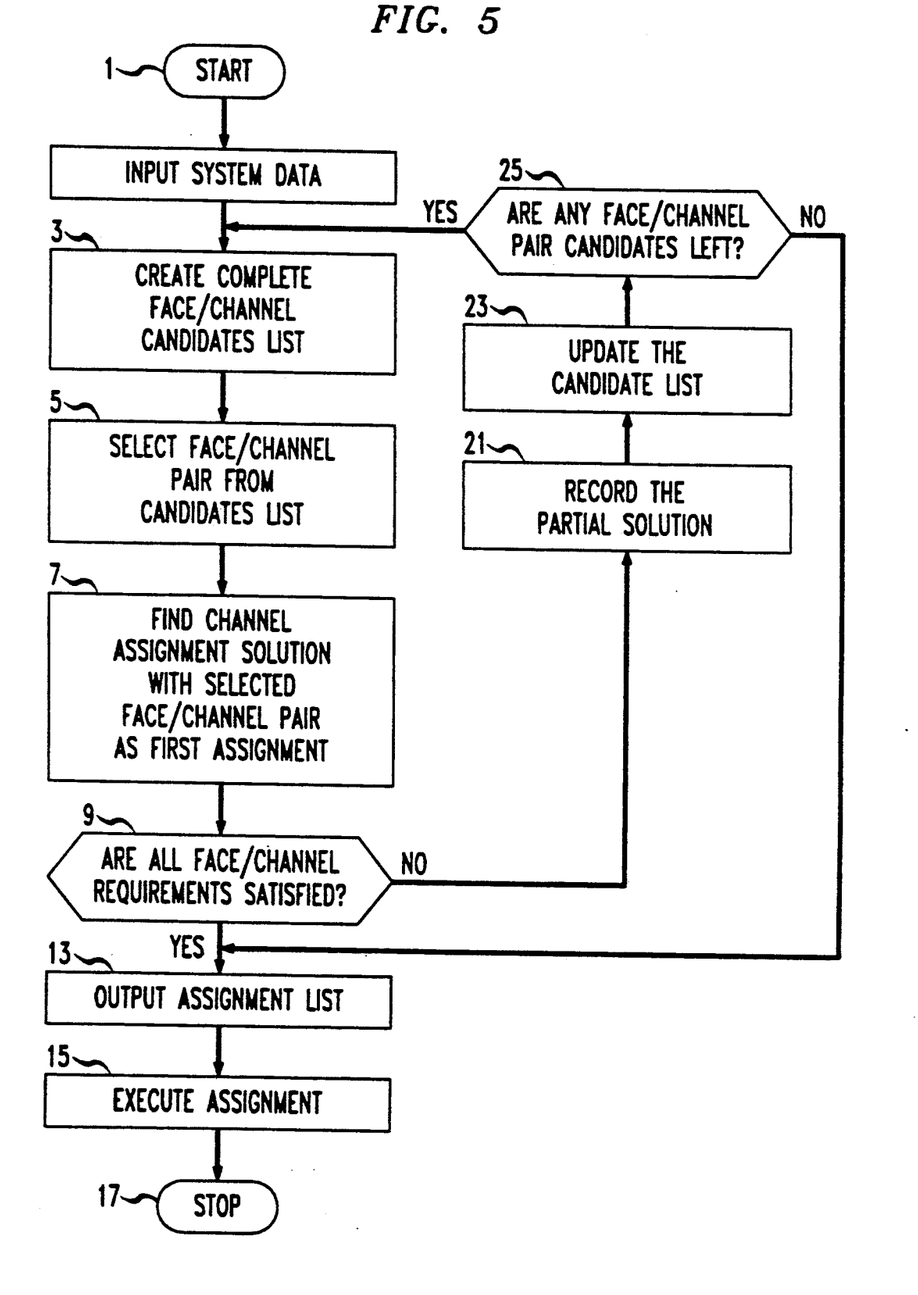
FIG. 5 is a block diagram of the steps of generating and executing face/channel assignments.

The process performed in the channel assignment computer, as shown in the flow chart of FIG. 5, is an illustrative process, performed within the channel assignment computer 420, to generate a list of paired face channel items for use in assigning channels to designated faces. Details of this assignment process, of FIG. 5, are shown in the subsequent flow charts of FIGS. 6 to 10. The process, of FIG. 5, starts at the terminal 1 and system data comprising the faces and the channels available is input according to the instructions of the block 3. From this data a list of face/channel candidates is prepared as per the instructions of the block 5. This list may be all inclusive in a combinatory way or it may be a hueristic list based on special circumstances of the particular cellular system in which the assignments are being applied. The flow process proceeds to the block 7 which selects a face/candidate pair from the list established according to the block 5. Using this face/channel pair as a starting point a channel assignment solution is found which fully satisfies the input constraints, and which fulfills the channel requirements of each face as much as possible. The first pair is used to start this process. Decision block 11 determines if all the face channel requirements have been met (i.e. have all faces and channels been satisfactorily paired to completely meet solution requirements). As long as solution requirements require that the process continue to make these assignments, the flow continues to the block 21 which is operative to cause a recording of the growing partial solution of assignments obtained up to this point in the process. The candidates list is updated in the block 23 by pruning or eliminating assigned items from the list in order to reflect each partial solution found. If face/channel candidates remain on the candidates list, as per the decision of decision block 25, the flow proceeds to the input of the block 7 which now selects another face/channel pair for the assignment process. Upon the completion of the list and/or satisfaction of the requirements the flow proceeds to the block 13 which outputs the assignment list. The next step in the process is to execute the assignments as per the block 15. This operation may be performed manually or by stored program control to automatically remotely tune the radio transceivers at the cell or base sites.

Figure 6:
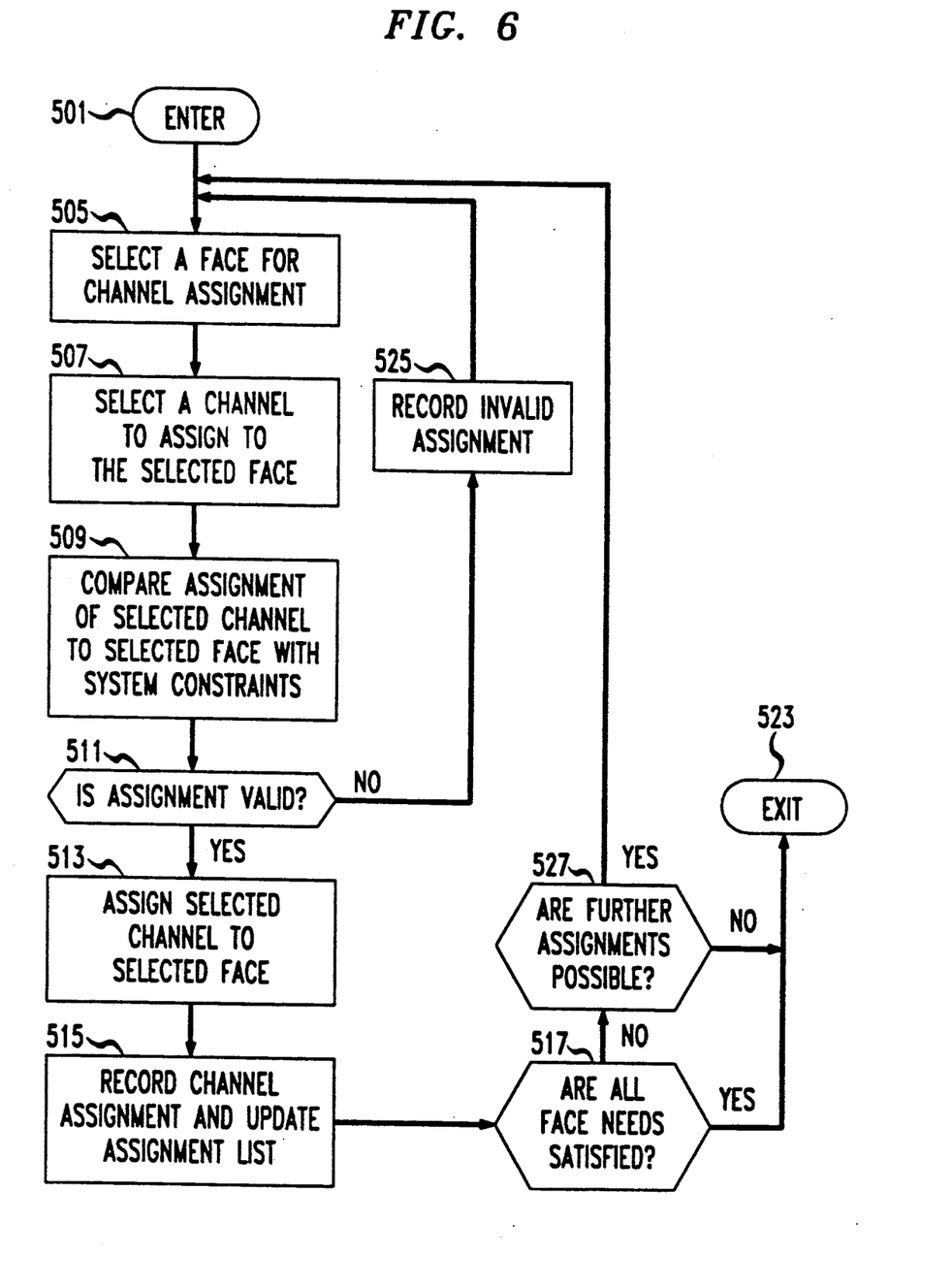
FIG. 6 is a process flow chart of the steps of determining individual face/channel assignments.

The overall sub-process of assigning channels to faces is shown in FIG. 6 and begins at the start terminal 501. The process starts with the input (block 503) of the face constraining input data to the processing system. Such data includes the signal matrix, face and cell channel spacing information, S/I constraints, channel requirements at each face and data identifying neighboring faces and neighbor channel spacing. This process of supplying the input date is shown in more detail in the flow process of FIG. 7. From the faces in the system a particular face is initially selected for channel assignment as per the instructions of the block 505. Selection of this face, such as is shown in the flow process of FIG. 8, may be adjudged on any selected factors that the user deems critical. Such selection criteria may be the traffic needs of that face and its current availability for assignment. The sub-process of block 505 is disclosed in more detail in the flow chart of FIG. 8 disclosed herein below. The next step in the process, defined by block 507, concerns the selection of a channel to assign to the face selected in block 505. In this step the availability of channels for assignment must be evaluated. This selection may be based on the extent of prior face assignments of a particular channel. Details of this channel selection sub-process are disclosed in the flowchart shown in FIG. 9.

A channel face assignment, or pairing, is proposed as shown in function block 509 and this assignment is compared with the system constraints put into the assignment system. This assignment is evaluated in the decision block 511 to determine if this assignment is valid. If the assignment is determined to be invalid the invalid assignment is recorded as per block 525 and the flow proceeds to the input to block 505 to begin selecting a new face and channel pair to assess for assignment. Checking assignment validity is shown in the sub-process of FIG. 10, discussed herein below.

If the assignment is deemed to be valid in decision block 511 the flow proceeds to the function block 513 which assigns the selected channel to the selected face. This assignment is recorded in the function block which adjusts the list of available face/channel candidate list to reflect this assignment. The subsequent decision block 517 determines if all the requested assignments have been made (i.e. if this assignment makes the solution complete). If not the process proceeds to the decision block 527 which determines if further assignments obeying the system constraints are possible. If further assignments are possible the flow proceeds to the input of the block 505 which selects a new face/channel pair from the face/channel list.

If no further assignments are possible the process proceeds to the block 523 exiting with a partial solution. The process resumes in FIG. 5 at decision block 9 checking to see if all face channel assignments are satisfied. The process proceeds as shown in FIG. 5 and to block 21 to record the partial assignments and then return to select a new face/channel pair from the candidates list. When a partial solution is obtained the candidate list is pruned as discussed with reference to FIG. 5. This pruning is a hueristic process and can be as simple as removing those face/channel pairs which are present in the partial solution just found. As described with reference to FIG. 5 the assignment process continuously returns to the candidate list to begin the process again and continue the process until a complete solution is obtained or until the candidate list is exhausted.

The output of the block 13 may be a list for use by a craftsperson or may be applied to an automated tuning control system having a stored program control for automatically tuning the radio transceivers in the subject cellular system. The process may include the function block 15 in which the radio transmitters at the cell sites are automatically tuned to reflect the established face-channel pairings. The process stops in terminal 523 when the process is complete.

Figure 7:
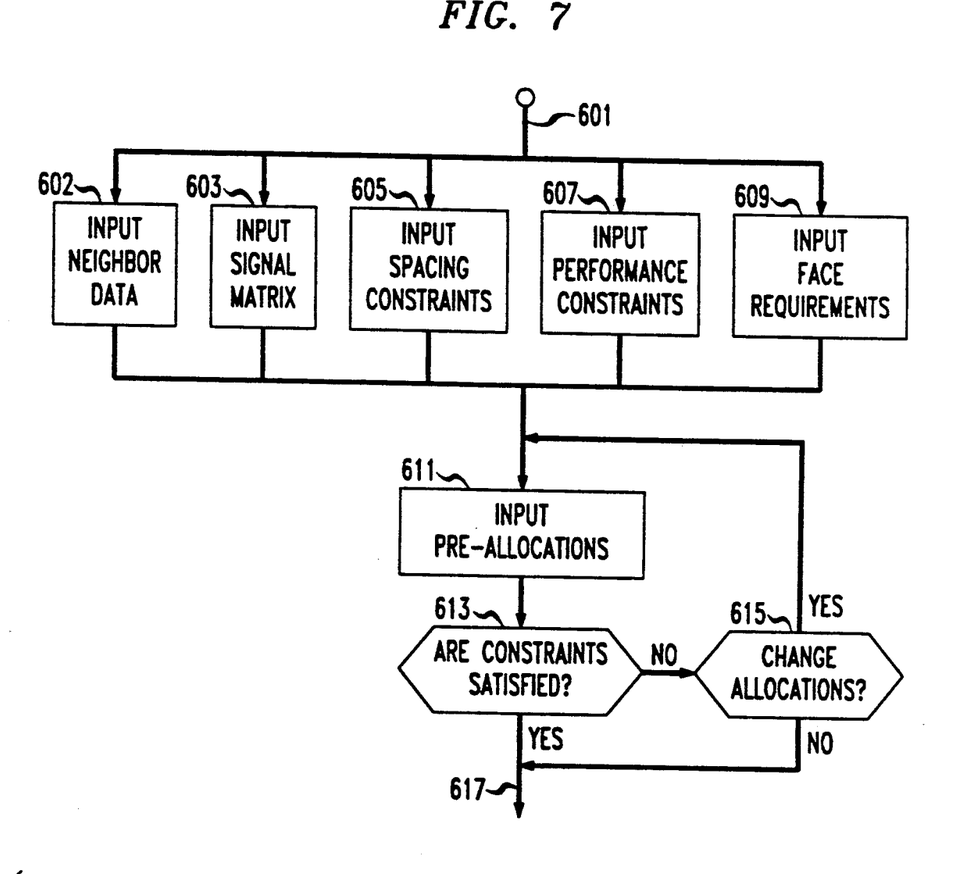
FIGS. 7 to 10 show flow charts for individual sub processes of the process shown in FIGS. 5 and 6.

The flow process for inputting data is shown in the flow diagram of FIG. 7. The input data includes the information defining the neighboring faces of block 602, the input signal matrix of block 603, the input spacing constraints of block 605, the input performance constraints of block 607 and the input face requirements of block 609. Neighboring faces can be identified in terms of a S/I value for comparison with the items of the matrix input in block 603. The signal matrix of block 603 is a matrix of integers, each associated with a face i, face j pair which indicates the RF propagation relationships (each expressed as a single signal-to-interference value) between face i and face j This signal matrix reflects the effects of terrain on signal propagation for all faces and indicates the suitability of making faces i and j co-channel. The spacing constraints of the block 605 include channel spacing information that specify how many channels must be skipped between assignments to that entity. There may be separate spacing requirements for each site, antenna (or face) and between neighboring antennas. These spacing constraints can be used to impose limitations on adjacent channel interference which occurs when a frequency at one frequency spills into an adjacent channel.

The input of block 607 is concerned with the system wide Signal/Interference constraint ratio between a carrying signal and any interfering signals on the same channel. This input imposes a system wide lower limit on S/I so that any two antennas (faces) which share a channel must have an S/I ratio better than the constraint.

Block 602 defines neighbor relationships between faces. This can be a list of face pairs, or it can be derived indirectly from the signal matrix. For example, if two cells are close enough to interfere with each other then these faces can be considered to be neighbors. The S/I value defining neighbors can be a user specified input. In this case, any two faces with a signal matrix S/I value less than or equal to the constraint are considered to be neighbors.

The input face requirements of block 609 define the channel requirements for each face by specifying how many channels are needed at each face to satisfy traffic requirements.

With the initial data entry the flow proceeds to block 611 which includes data concerning the pre-allocation of channels already made to logical faces in the system. These pre-allocations define the starting point from which the balance of channel allocations are assigned. The pre-allocations may be any combination of faces and channels. The number of pre-allocations may be zero or it might correspond to the current frequency plan of an existing system. The flow proceeds to block 613 which determines if the preallocations meet the defined system constraints. If these constraints are satisfied the process proceeds to the process defined in FIG. 8. If the constraints are not met the flow proceeds to the block 615 which proceeds to the input of block 611 to respond to permit changes to be made to the specified pre-allocations. If the allocations are not changed the flow may proceed to lead 617 permitting the balance of the process to proceed to a full or partial solution of the channel assignment process.

Figure 8:
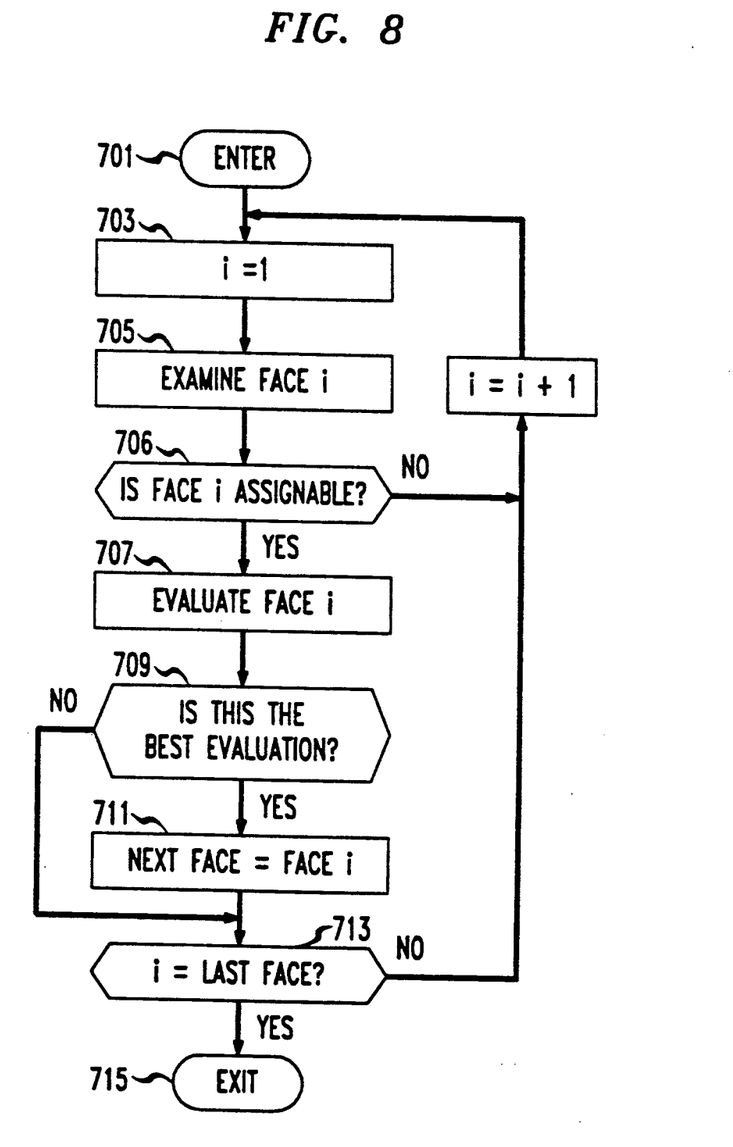

The selection of faces for channel assignment is performed by the flow process of FIG. 8. In the illustrative embodiment the process selects the most desirable face for assignment from the totality of N faces in the system. The process of FIG. 8 terminates when all N faces have been evaluated. Through out this process the selected face is the designed "next face". The process is entered at terminal 701 and proceeds to the block 703 which initially sets the variable i to one. The next block 705 in the process examines the face designated i to determine if that face has channel needs that have not been met. Base on this information the decision block 706 determines if the face i is assignable. If it is not the flow proceeds to block 717 which increments the value i and returns the process flow to block 705 to examine the new face i. If the face i is assignable the flow proceeds to block 707 to evaluate the face i in terms of the need of face i for an assignment as compared with the needs of other faces. This criteria is stored as per block 707. In the illustrative example the decision block 709 determines if this face i is the face considered to date as having the greatest need for channel assignment based on the data accumulated as per block 707. Other criteria may be used for this selection. If face i is determined to have the greatest need, the flow proceeds to the block 711 and this face i is the face selected for the immediate assignment process. The next block 713 determines if this is the last face to be considered. If face i is not the face with the greatest need the flow proceeds to decision block which inquires if this is the last face for consideration in decision block 713. This sub process exits at terminal 715 with the selected face designated as "next face".

Figure 9:
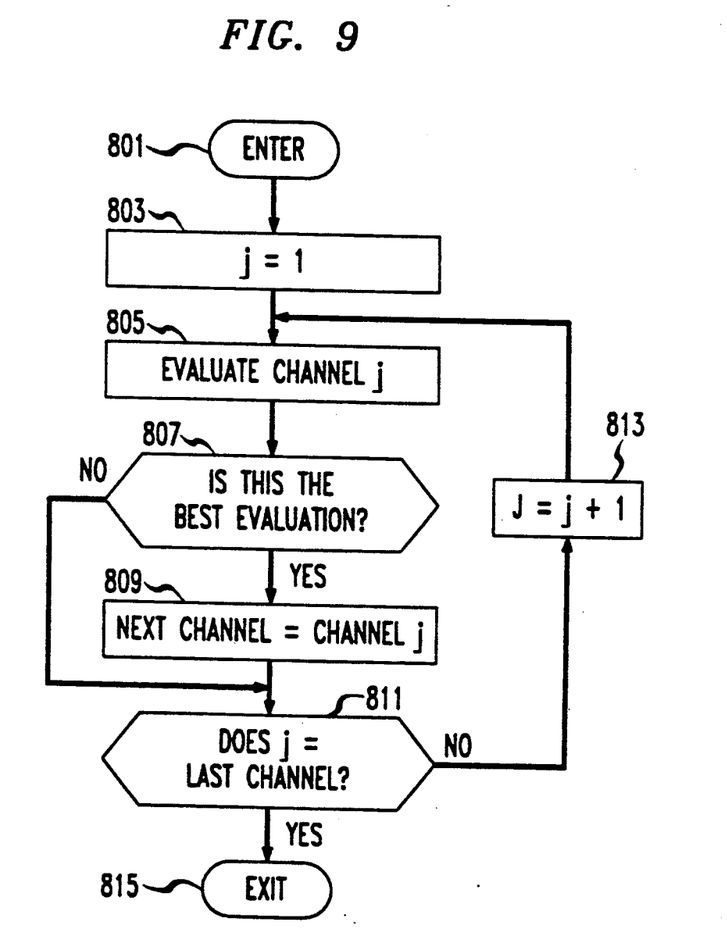

The process of selecting channels for pairing with the previously selected face i is disclosed in the flow process of FIG. 9. The variable j is initially set to one in the block 803 and the channel designated j is evaluated in the block 805, according to the illustrative embodiment, as to its availability and extent of previous assignments. In the illustrative example, the data of block 805 is evaluated by decision block 807 to determine if this channel j is the least assigned channel of the channels already considered. If it is then it is designated as the next channel to be used in the assignment process and the decision block 811 determines if all the available channels have been considered. If the channel under consideration in decision block 807 is not a channel suitable for assignment the flow proceeds directly to the decision block 811 to determine if this is the last channel for consideration. In all instances where there are additional channels for consideration the flow proceeds to block 813 to increment the value j and the process begins again at block 805 with the channel having the incremented j value. This sub process exits at terminal 815 with the selected channel being designated as the "next channel".

Figure 10:
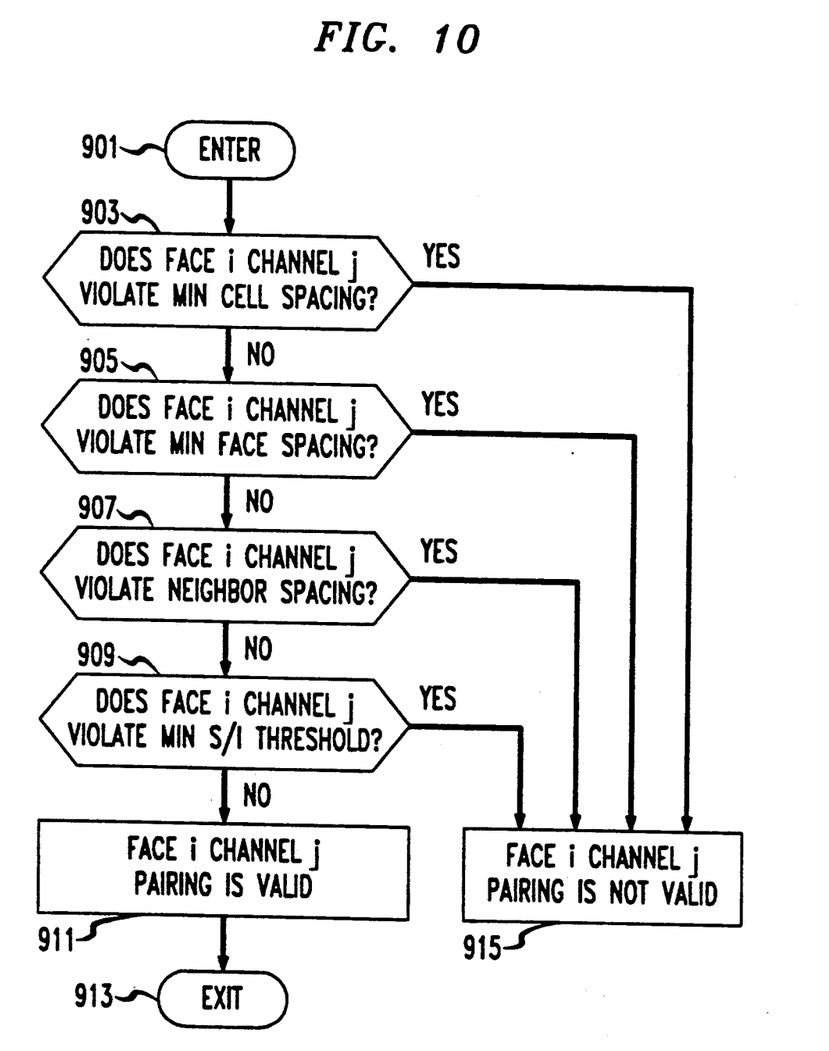

The determination of the validity of a particular face/channel ij pair assignment is evaluated in the flow process of FIG. 10. The process is entered at the terminal 901 and the flow proceeds to the decision block 903 to determine if the proposed face-channel ij pairing violates the minimum cell spacing constraints which determines if a channel j is too close to other channels already assigned to the cell containing the face i. If this constraint is not violated the flow proceeds to the decision block 905 to determine if the proposed ij face-channel pairing violates the minimum face spacing constraints. These constraints determine if a channel j is too close to other channels already assigned to the face i. The next decision block 907 determines if the proposed pairing violates neighbor spacing constraints. This evaluation determines if a channel j is too close to channels already assigned to faces deemed to be neighbors of face i. This determination of which faces are neighbors may be a direct input of system data or constraints or it may be derived using a single S/I threshold value that defines neighboring faces. The final decision block 909 determines if the proposed pairing of face i has a signal matrix S/I value better than the system wide S/I constraint input to the decision process for all faces to which channel j has already been assigned. That is, the system wide S/I constraint is compared to all elements of the S/I matrix that pertain to face i and those faces already assigned channel j. It tests those S/I matrix elements against the system wide S/I constraint that is initially input to the programmed assignment system. If that matrix element is greater than the constraint the assignment is valid. If it is less than the constraint, the assignment is not valid. If any of the constraints are violated during this decision process in any of the blocks 903, 905, 907 and 909 the flow proceeds to the block 915 which identifies this pair as being invalid. The flow from block 915 proceeds to the block 515 in FIG. 5 where the failure is noted and the process proceeds to the exit terminal 920. The process returns to the flow process of FIG. 6 to evaluate the next face and channel pair selected. If none of the constraints are violated the process exists in the terminal 913 and the flow proceeds with block 513 in FIG. 6 and the balance of the process is as described above.

We claim:

1. A method for assigning channels to geographical areas referred to as logical faces of a cellular system and which areas are served by designated radio transmitters and antennas, comprising the steps of:

generating a signal/interference function between each and every logical face in a form of face i face j pairs; where i and j are integers from one up to a number equaling a number logical faces;

defining a candidate list of paired channels and logical faces;

preparing a list of system constraints;

selecting a logical face for channel assignments;

selecting a channel to be assigned;

evaluating a first face/channel pair with respect to the system constraints;

determining if the assignment is valid within the limits of the constraints;

assigning the channel to the logical face with which it is paired;

maintaining a list of assigned channels and faces;

selecting another logical face for channel assignment and an additional channel to be assigned until all possible channel assignments have been performed;

maintaining the channel assignments for a time duration substantially exceeding an average time required for individual calls in the cellular system.

2. A method for assigning channels to the logical faces of a cellular system as claimed in claim 1, further comprising:

the step of selecting another face includes the step of determining if all the channels have been assigned.

3. A method for assigning channels to the logical faces of a cellular system as claimed in claim 1, further comprising:

the step of selecting another face includes the step of determining if further channel assignments are possible.

4. A method for assigning channels to the logical faces of a cellular system as claimed in claim 1, wherein the step of:

selecting a face for channel assignment includes a step of selecting a face with a highest need to receive a channel assignment.

5. A method for assigning channels to the logical faces of a cellular system as claimed in claim 1, wherein the step of:

selecting a face for channel assignment includes a step of selecting a face for chanel assignment which is a near face to a face just previously assigned a channel to receive a channel assignment.

6. A method for assigning channels to the logical faces of a cellular system as claimed in claim 1, wherein the step of:

selecting a face for channel assignment includes a step of selecting a face with both a highest need to receive a channel and which is a near face to a face just previously assigned a channel to receive a channel assignment.

7. A method for assigning channels to the logical faces of a cellular system as claimed in claim 1, wherein the step of:

selecting a channel includes a step of selecting a channel having the fewest face assignments.

8. A method for assigning channels to geographical areas referred to as logical faces in a cellular system and which areas are served by designated radio transmitters and antennas, comprising the steps of:

inputing selected cellular system constraints;

inputing a S/I matrix having elements representing a signal to interference level between logical faces in a given cellular system;

preparing a list of the logical faces and channels available for assignment;

selecting an initial face channel pair, firstly comparing the initial face channel pair with a cell spacing constraint;

secondly comparing the initial face channel pair with a logical face spacing constraint;

thirdly comparing the initial face channel pair with a S/I threshold constraint;

assigning the channel to the face if the first, second and third comparisons are satisfactory;

maintaining the assignment of the channel to the face for a time duration substantially exceeding an average time required for individual calls in the cellular system.

9. A method for assigning channels to faces in a cellular system, as claimed in claim 8, wherein the step of selecting an initial face channel pair includes the step of identifying a face having a greatest need for a channel assignment.

10. A method for assigning channels to faces in a cellular system, as claimed in claim 8, wherein the step of selecting an initial face channel pair includes the step of identifying a channel having been least priorly assigned from the list of available channels.

11. A method for assigning channels to faces in a cellular system, as claimed in claim 8, further including the step of:

continuously maintaining a running list of channel assignments during processing for creating channel assignments and using the running list of channel assignments as a final channel if the method of assigning channels comes to a premature termination.

12. A cellular radio telephone system; comprising:

a plurality of radiotelephone communications apparatus operating with assigned channels;

a signal matrix computer for supplying a signal-to-interference matrix;

a source of channel assignment constraints;

a channel assignment computer responsive to the signal matrix computer and the source of channel assignment constraints; and including:

means for evaluating if a selected face/channel pair violates a threshold value determined by the signal matrix computer, and a channel assignment control responsive to the channel assignment computer, the plurality of radiotelephone communication apparatus being tuned in response to the channel assignment control apparatus for a time duration exceeding an average call duration of the radiotelephone communication apparatus.

13. A cellular radiotelephone system as claimed in claim 12, further comprising:
   the channel assignment computer further including means for evaluating if a selected face/channel pair violates a minimum face spacing requirement determined by the signal matrix computer.

14. A cellular radiotelephone system as claimed in claim 12, further comprising:
   the channel assignment computer further including means for evaluating if a selected face/channel pair violates a neighbor spacing requirement determined by the signal matrix computer.

15. A cellular radiotelephone system as claimed in claim 12, further comprising:
   the channel assignment computer further including means for evaluating if a selected face/channel pair violates a minimum cell spacing requirement determined by the signal matrix computer.

16. A cellular radiotelephone system as claimed in claim 12, further comprising:
   the channel assignment computer further including means for evaluating if a selected face/channel pair violates a neighbor spacing requirement determined by the signal matrix computer.

* * * * *